D. P. CARTWRIGHT.
THERMOSTATIC CONTROL FOR ELECTRIC MOTORS.
APPLICATION FILED SEPT. 28, 1914.
1,136,312.
Patented Apr. 20, 1915.
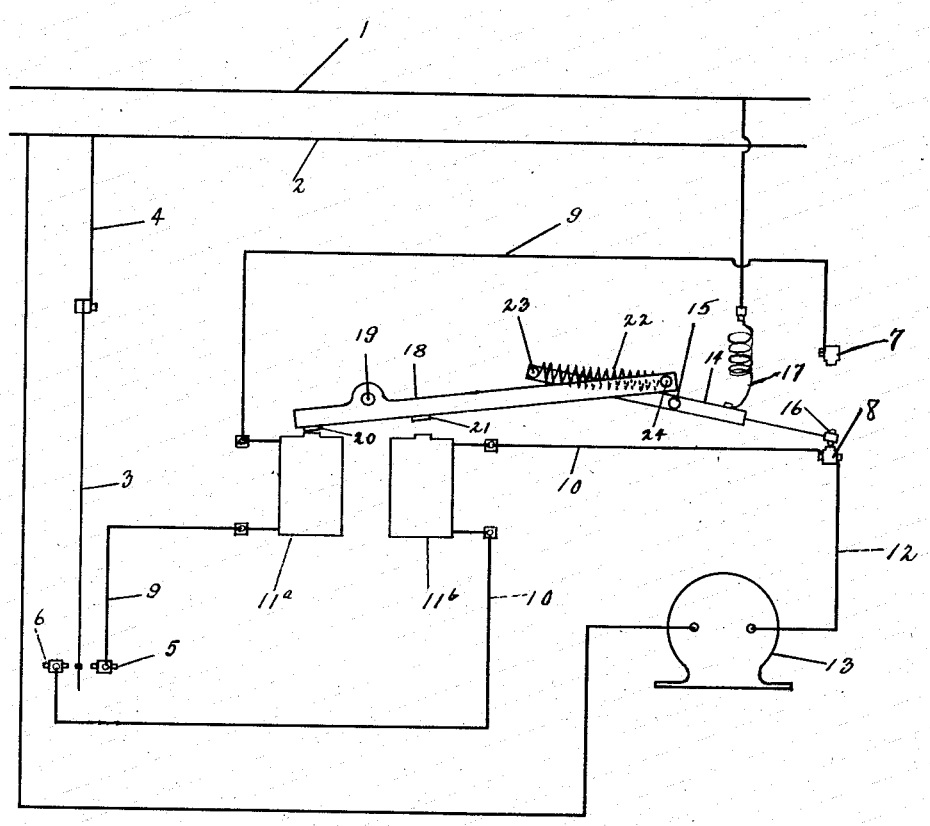

UNITED STATES PATENT OFFICE.

DALE P. CARTWRIGHT, OF FORT WAYNE, INDIANA, ASSIGNOR TO FRIGIFAX MANUFACTURING COMPANY, OF LA FAYETTE, INDIANA, A CORPORATION OF INDIANA.

THERMOSTATIC CONTROL FOR ELECTRIC MOTORS.

1,136,312.  Specification of Letters Patent.  Patented Apr. 20, 1915.

Application filed September 28, 1914. Serial No. 863,862.

*To all whom it may concern:*

Be it known that I, DALE P. CARTWRIGHT, a citizen of the United States of America, residing at the city of Fort Wayne, county of Allen, State of Indiana, have invented certain new and useful Improvements in Thermostatic Control for Electric Motors, of which the following is a specification.

My invention relates to means for controlling an electric motor by a thermostat in order to cause the motor to operate within pre-determined degrees of temperature. I accomplish this result by the operation of the thermostat controlling shunt circuits to operate an electric switch whereby the current to the motor is diverted at pre-determined intervals, such intervals being regulated by the operation of the thermostat.

I have illustrated my invention diagrammatically believing that such diagram will sufficiently disclose the invention.

1 and 2 are the main line, 3 is a thermostat electrically connected with the main line by 4; 5 and 6 are contact points between which the thermostat 3 is interposed, 7 and 8 are contact points adjacent to each other between which is mounted the switch hereafter to be described.

9 is a shunt circuit connecting the points 5 and 7 and including an electro-magnet 11$^a$; 10 is a second shunt circuit connecting the contact points 6 and 8 and including the electro-magnet 11$^b$; 12 is a circuit leading from the contact point 8 to the main line 2 including the motor 13; 14 is a beam pivoted at 15 carrying the contact point 16; 17 is an elastic electrical connection interposed between the main line 1 and the beam 14, preferably made in the form of a helix to permit the rocking of the arm 14 so as to cause the contact point 16 to make contact either with the contact point 7 or 8; 18 is a beam pivoted at 19 while 20 and 21 are armatures secured to the beam 18 on either side of its pivotal connection 19; 22 is a helical spring secured at either end to the beams 14 and 18 as at 23 and 24.

The operation of the device is as follows: When, for instance, the temperature has risen and it is desirable to start the motor in order to compress the ammonia gas and create refrigeration, the thermostat 3 is affected by the higher temperature to bend in the direction of the contact point 5 and when contact is made therewith the current flows from the main line 2 through the thermostat and shunt circuit 9 to the contact point 7, contact point 16 and electrical connection 17 to the main line 1. The electro-magnet 11$^a$ being included in this circuit attracts the armature 20 rocks the beam 18 on its pivot 19 and through the spring 22, causes the beam 14 to rock away from the point 7 into the position shown in the drawing. Circuit is thereby made from the main line 1 through the connection 17 and 16 to the point 8 and circuit 12 through the motor to the main line 2. The motor will continue to operate and by so doing cause the temperature to fall thus influencing the thermostat 3 in the opposite direction until it makes contact with the point 6. The current will then flow from the main line 2 through the shunt circuit 10, points 8 and 16, electrical connection 17 to the main line, the resistance here interposed being less than that presented by the circuit 12 including the dynamo. As the electro-magnet 11$^b$ is included in the circuit 10 that magnet will be energized and attract the armature 21, thus rocking the beam 18 on its pivot 19 and causing the beam 14 to rock through the agency of the spring 22, until the contact point 16 is in contact with the point 7, thus shunting the current to the motor and leaving the apparatus in position to be again operated when the thermostat 3 shall again contact with the point 5.

I have illustrated one embodiment of my invention but I do not intend to limit myself to this particular form.

What I claim is:

In a thermostatic electric motor control, a thermostat in circuit with the main line interposed between two contact points, two other contact points adapted to coöperate with a switch interposed between them designated herein as switch contacts, two shunt circuits each including an electro-magnet and each connecting respectively one of said thermostatic contact points with one of said switch contact points, a circuit including a motor connecting one of said switch contact points and the main line, a beam centrally pivoted and carrying at one end a contact member adapted to contact with said switch contact points, an elastic electrical connection interposed between said beam and the main line, a second beam centrally pivoted, armatures mounted on said second beam on either side of its pivotal connection said armatures adapted to coöperate with said electro-magnets respectively, said beams being connected at one end of each by a helical spring.

Signed by me at Fort Wayne, Indiana, this 17th day of September, 1914.

DALE P. CARTWRIGHT.

Witnesses:
 C. R. LANE,
 E. HONEMIT.